May 22, 1951  C. H. HYER  2,554,053
AUTOMATIC BACK WATER VALVE
Filed Nov. 7, 1947

INVENTOR.
Charles H. Hyer
BY Victor J. Evans & Co.
ATTORNEYS

Patented May 22, 1951

2,554,053

UNITED STATES PATENT OFFICE 2,554,053

AUTOMATIC BACKWATER VALVE

Charles H. Hyer, West Baden Springs, Ind.

Application November 7, 1947, Serial No. 784,750

2 Claims. (Cl. 182—16)

This invention relates to an automatic back water valve or drain trap, and the primary object of the invention is to prevent water from the sewer backing up into the cellar or basement in which the trap is located.

Another object of this invention is to provide a device that will prevent property damage, prevent sickness caused by the water entering the property and constructed of aluminum and brass, will be durable.

The device is so constructed that while fluids may flow freely through the valve into the trap, such liquids will be prevented from flowing backwardly through the valve. It is constructed of a few simple parts, will not easily get out of order, and can be made any size desired.

With the above and other objects and advantages in view, the invention consists of the novel details of construction, arrangement and combination of parts more fully hereinafter described, claimed and illustrated in the accompanying drawing in which:

Figure 1:
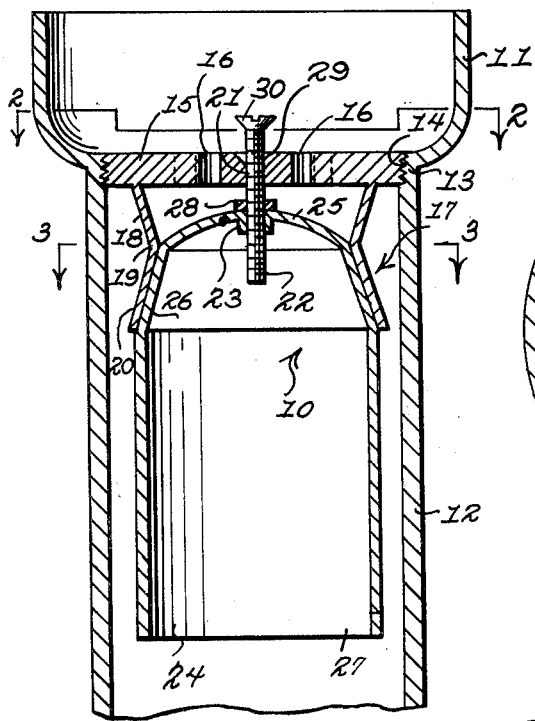
Figure 1 is a vertical, sectional view of an embodiment of the invention.
Figure 2:
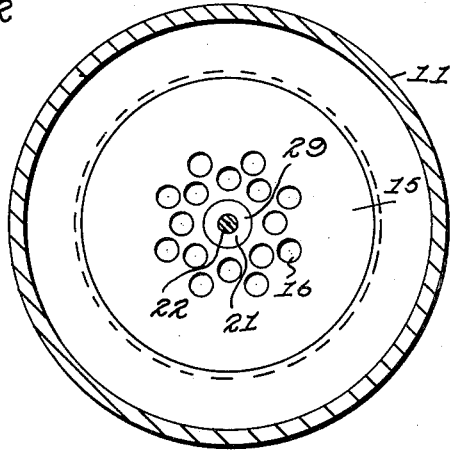
Figure 2 is a cross-sectional view on the line 2—2 of Figure 1.
Figure 3:
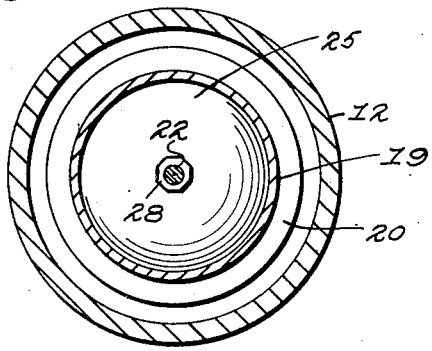
Figure 3 is a cross-sectional view on the line 3—3 of Figure 1.

Referring more in detail to the drawing, the reference numeral 10 designates the valve which is constructed in accordance with the invention. In the drawing, for purposes of illustrating the manner in which the valve is mounted, there is shown the trap or basin 11, which is formed on the upper end of the sewer pipe connection 12. In the usual practice, a grating or strainer would be placed over the circumferential rim of the trap 11. However, in carrying out the invention, the basin, at its lower periphery, is provided with threads 13. Engageable with the threads 13, is the threaded periphery 14 of the removable strainer 15 which, in the usual construction, is provided with the openings 16. The strainer thus prevents debris from entering the pipe 12 through the basin 11 and can be replaced or removed as desired when the sewer needs repair.

Formed on the under surface of the strainer 15, outwardly of the openings 16, is the valve seat 17. This seat has the inwardly flared portion 18 terminating at the throat 19, and the outwardly flared portion 20 depending from the throat 19.

Centrally of the strainer 15, there is provided a smooth bore 21, which slidably receives the screw 22, which is secured to the threaded boss 23 of the valve 24.

The valve has a rounded nose end 25 which extends into the seat 17, and when in closed position, this nose will extend beyond the horizontal plane of the throat 19. The valve 24 is of a bell-like construction, having an inclined portion 26 which engages with the portion 20 of the seat 17 when the valve is in closed position. Depending from the portion 26 is the skirt portion 27. Thus back water entering the skirt portion 27 will force the valve 24 upwardly into closed position, as shown in Figure 1.

The screw 22 is adjustable with relation to the threaded boss 23 to adjust the open position of the valve, and a lock nut 28 on the screw will prevent the valve from rotating and changing the adjustment, once it has been made. The opening 21, about its upper edge, is countersunk at 29 so that the similarly shaped head 30 of the screw will seat in the countersink, and provide a smooth surface on which debris will not catch to prevent full operation of the valve.

It will be obvious that the valve 24 is free to play up and down within the valve seat. When there is downward pressure, fluid will flow freely through the trap. However, should there be back pressure, the valve will be caused to close and prevent any upward escape of the back water. The valve will be closed before the water is given a chance to escape, since the air trapped in the valve will make it buoyant enough to rise above the water. Since the valve is always in contact with the water when it backs up in the drain pipe and the water will form a seal about the valve, gas will not be permitted to enter through the trap.

It is believed that from the foregoing description the operation and manner of construction of the device will be apparent to those skilled in the art, and it is to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. A valve for use with a trap or the like comprising a strainer adapted to be removably secured to said trap, a valve seat having an inwardly flared portion terminating in a throat portion, and an outwardly flared portion depending below said throat portion formed on the undersurface of said strainer, a bell like valve engageable with the outwardly flared portion of said seat and means for operatively connecting said valve to said strainer to permit up and down movement of said valve.

2. The invention as in claim 1, wherein the means for connecting the valve to the strainer permits adjustment of said valve and means is provided on said first means to retain said adjustment and prevent rotation of said valve.

CHARLES H. HYER.

REFERENCES CITED

The following references are of record in the file of this patent:

UNITED STATES PATENTS

| Number | Name | Date |
|---|---|---|
| 122,866 | Sturm | Jan. 16, 1872 |
| 844,003 | Conrad | Feb. 12, 1907 |

FOREIGN PATENTS

| Number | Country | Date |
|---|---|---|
| 417,804 | France | Sept. 10, 1910 |